(12) United States Patent
Guo

(10) Patent No.: US 12,526,819 B2
(45) Date of Patent: Jan. 13, 2026

(54) METHODS AND SYSTEMS OF DOWNLINK AND UPLINK TRANSMISSION CONFIGURATION INDICATOR (TCI)

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 329 days.

(21) Appl. No.: 18/217,836

(22) Filed: Jul. 3, 2023

(65) Prior Publication Data

US 2023/0345505 A1    Oct. 26, 2023

Related U.S. Application Data

(63) Continuation of application No. PCT/IB2022/050032, filed on Jan. 4, 2022.

(60) Provisional application No. 63/133,455, filed on Jan. 4, 2021.

(51) Int. Cl.
*H04W 72/232* (2023.01)
*H04B 7/06* (2006.01)
*H04L 5/00* (2006.01)
*H04W 72/12* (2023.01)

(52) U.S. Cl.
CPC ...... *H04W 72/232* (2023.01); *H04B 7/06968* (2023.05); *H04L 5/0053* (2013.01); *H04W 72/12* (2013.01)

(58) Field of Classification Search
CPC ............ H04W 72/232; H04W 72/12; H04B 7/06968; H04L 5/0053
See application file for complete search history.

(56) References Cited

U.S. PATENT DOCUMENTS

| 2019/0132828 A1* | 5/2019 | Kundargi | ............. H04B 17/318 |
| 2020/0162144 A1* | 5/2020 | Zhou | ..................... H04L 5/0048 |
| 2020/0413390 A1 | 12/2020 | Rahman et al. | |
| 2021/0226689 A1* | 7/2021 | Farag | ................... H04B 7/0617 |
| 2021/0227530 A1* | 7/2021 | Farag | ................... H04B 7/0695 |

(Continued)

FOREIGN PATENT DOCUMENTS

| CN | 113597779 A | 11/2021 |
| WO | 2020164600 A1 | 8/2020 |

OTHER PUBLICATIONS

ZTE. "Enhancements on Multi-beam Operation" 3GPP TSG RAN WG1 Meeting #102-e R1-2005454, Aug. 28, 2020 (Aug. 28, 2020). 11 pages.

(Continued)

*Primary Examiner* — Jael M Ulysse
(74) *Attorney, Agent, or Firm* — BAYES PLLC

(57) ABSTRACT

Methods and devices for configuring a transmission configuration indicator (TCI) are provided. In some embodiments, the method includes (i) receiving a list of TCI states by a terminal device; and (ii) determining a joint TCI, by the terminal device, based on the list of the TCI states. At least one of the TCI states includes one or more first parameters for a downlink (DL) transmission and one or more second parameters for an uplink (UL) transmission. The joint TCI indicates parameters for both DL and UL transmissions of the terminal device.

20 Claims, 5 Drawing Sheets

(56) References Cited

U.S. PATENT DOCUMENTS

| | | | | |
|---|---|---|---|---|
| 2021/0274503 | A1* | 9/2021 | Farag | H04W 76/11 |
| 2021/0385832 | A1 | 12/2021 | Zhang et al. | |
| 2022/0210818 | A1* | 6/2022 | Cirik | H04W 72/232 |
| 2022/0286868 | A1* | 9/2022 | Kim | H04L 1/0075 |
| 2022/0312485 | A1* | 9/2022 | Zhang | H04B 7/06956 |
| 2022/0386332 | A1* | 12/2022 | Yokomakura | H04W 72/23 |
| 2022/0393724 | A1* | 12/2022 | Matsumura | H04W 16/28 |
| 2022/0394701 | A1* | 12/2022 | Zhang | H04L 5/0023 |
| 2023/0232481 | A1* | 7/2023 | Park | H04L 5/0094 370/329 |
| 2023/0291533 | A1* | 9/2023 | Zhou | H04B 7/088 |
| 2023/0292250 | A1* | 9/2023 | Määttänen | H04W 52/242 |
| 2023/0300604 | A1* | 9/2023 | Zhou | H04W 8/24 370/328 |

OTHER PUBLICATIONS

International Search Report in the international application No. PCT/IB2022/050032, mailed on Mar. 29, 2022. 3 pages.

Written Opinion of the International Search Authority in the international application No. PCT/IB2022/050032, mailed on Mar. 29, 2022. 5 pages.

Apple Inc: "On Beam Management Enhancement", 3GPP Draft; R1-2008438, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 26, 2020-Nov. 13, 2020, Nov. 1, 2020 (Nov. 1, 2020), XP052350366, sections 1-6.

ZTE: "Enhancements on Multi-beam Operation", 3GPP Draft; R1-2007763, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 26, 2020-Nov. 13, 2020, Nov. 1, 2020 (Nov. 1, 2020) XP052349125, sections 1-3.

Supplementary European Search Report in the European application No. 22734776.2, mailed on Jun. 4, 2024. 8 pages.

* cited by examiner

| R | Serving Cell ID | BWP ID | Oct 1 |
|---|---|---|---|
| $C_{0,1}$ | TCI state $ID_{0,1}$ | | Oct 2 |
| $C_{0,2}$ | TCI state $ID_{0,2}$ | | Oct 3 |
| ... | ... | | ... |
| $C_{N,1}$ | TCI state $ID_{N,1}$ | | Oct M-1 |
| $C_{N,2}$ | TCI state $ID_{N,1}$ | | Oct M |

FIG. 2

METHODS AND SYSTEMS OF DOWNLINK AND UPLINK TRANSMISSION CONFIGURATION INDICATOR (TCI)

CROSS-REFERENCE TO RELATED APPLICATIONS

This application is a continuation of International Application No. PCT/IB2022/050032 filed on Jan. 4, 2022, which claims the benefit of U.S. Provisional Patent Application Ser. No. 63/133,455, filed on Jan. 4, 2021, both of which are hereby incorporated by reference in their entirety

BACKGROUND

Two transmission schemes are supported for Physical Uplink Shared Channel (PUSCH) transmission, codebook-based transmission and non-codebook based transmission. For non-codebook based transmission, a terminal device (or user equipment) determines its PUSCH precoder based on wideband SRI field from a downlink control information (DCI). For codebook-based transmission, a base station (or a next generation nodeB, gNB) provides the terminal device UE with a transmit precoding indication in the DCI.

In current design, Tx beams for DL and UL channels and signals are indicated through separate signaling and frameworks. For DL channels, TCI states are configured and then indicated separately for Physical Downlink Control Channel (PDCCH) and activated for Physical Downlink Shared Channel (PDSCH). For PUSCH, the Tx beam indication is signaled through a Sounding Reference Signal (SRS) resource indicator (SRI) in a DCI (downlink control channel) or RRC (radio resource control) configuration. For PUCCH, the Tx beam indication through a PUCCH spatial relation info configuration. The foregoing scheme is complex and accordingly imposes significant burden on system beam operation. This "separate" signaling framework increases latency and signaling overhead for beam operations and thus impairs system efficacy and performance. Therefore, it is advantageous to have improved devices and methods to address the foregoing issue.

SUMMARY

The present disclosure relates to downlink (DL) and uplink (UL) transmission schemes that can improve transmission efficiency. More specifically, the present disclosure is directed to devices and methods that indicate DL and UL transmission (Tx) beams in a joint transmission configuration indicator (TCI).

The present disclosure is related to devices and methods of a common or joint TCI state framework for DL and UL channels and signals. The present disclosure includes how to configure common/joint TCI states for terminal devices (or UE) that support transmission across multiple component carriers (CCs) by a cross-CC common TCI state indication. Embodiments of the cross-CC common TCI state are discussed in detail with reference to FIG. 2.

Another aspect of the present disclosure includes devices and methods for determining acknowledgement for a joint TCI state indication by a DCI format. Yet another aspect of the present disclosure includes devices and methods for determining a timeline of applying the joint TCI state indication in accordance with embodiments of the present disclosure. The present disclosure also includes devices and methods for configuring power control parameters with the joint TCI state indication. By the foregoing arrangements, the present devices and methods can effectively improve beam transmission efficiency with reduced amount of computing resources.

In some embodiments, the present method can be implemented by a tangible, non-transitory, computer-readable medium having processor instructions stored thereon that, when executed by one or more processors, cause the one or more processors to perform one or more aspects/features of the method described herein.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

FIG. 2 is a schematic diagram illustrating a joint TCI indicator in accordance with one or more implementations of the present disclosure.

DETAILED DESCRIPTION

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

Figure 1:
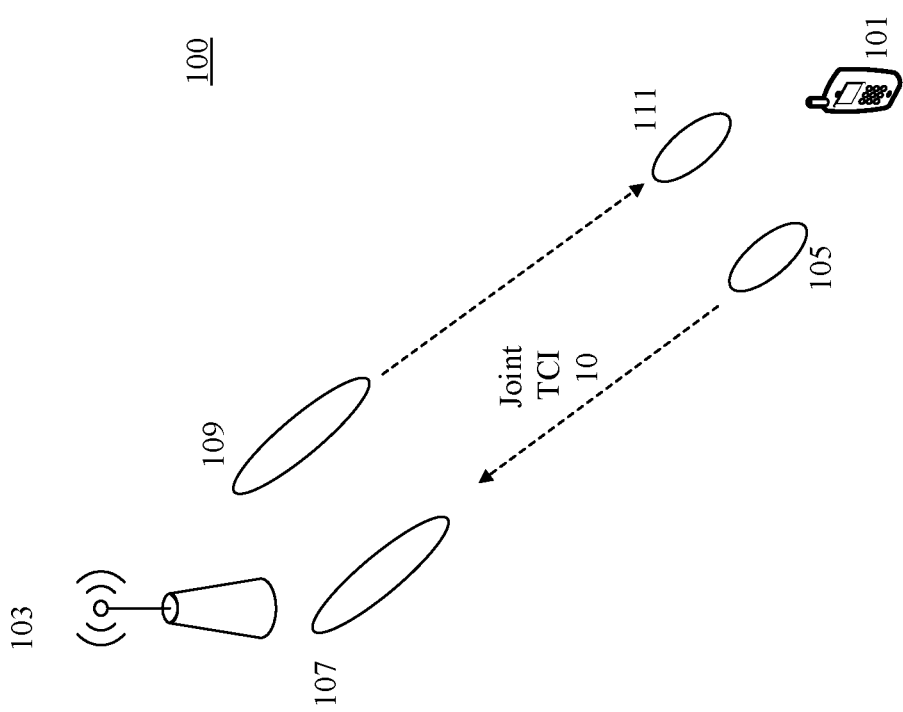
FIG. 1 is a schematic diagram illustrating a joint TCI framework in accordance with one or more implementations of the present disclosure.

FIG. 1 is a schematic diagram illustrating a joint TCI framework 100 in accordance with one or more implementations of the present disclosure. The joint TCI framework 100 includes a terminal device 101 and a base station 103. For a UL transmission, the terminal device 101 is configured to transmit via a UL TX beam 105, and the base station 103 is configured to receive via a UL RX beam 107. For a DL transmission, the base station 103 is configured to transmit via a DL TX beam 109, and the terminal device 101 is configured to receive via a DL RX beam 111. Both the UL and DL transmissions (e.g., including which TX beam to use) are indicated in a joint TCI indication 10.

In some embodiments, the terminal device 101 can be provided with a list of TCI states, and each TCI state includes one or more parameters for providing quasi-co-location (QCL) information for DL/UL transmissions. For example, the parameters can include PDCCH/PDSCH parameters, parameters for providing information for determining UL Tx spatial filter(s) for UL transmission, for example, PUSCH, PUCCH, and SRS parameters.

In some embodiments, a joint TCI state (e.g., the joint TCI state indication or indicator 10) can contain a reference signal identification (ID) that provides both QCL information for receiving DL transmission (e.g., DL TCI information) and information for determining UL Tx spatial filter (e.g., UL TCI information) for UL transmission.

In some embodiments, the terminal device 101 (e.g., UE) can have a TCI state with a reference signal ID that only provides QCL information for receiving DL transmission (such a TCI state can be called "DL TCI state"). In some embodiments, the terminal device 101 can have a TCI state with a reference signal ID that only provides information for determining uplink Tx spatial filter(s) for UL transmission (such a TCI state can be called "UL TCI state"). In such embodiments, the base station 103 (e.g., gNB) can indicate a first joint DL/UL TCI state to the terminal device 101 and the terminal device 101 can apply the QCL information included in the first joint DL/UL TCI state for receiving DL transmission and also apply the uplink Tx spatial filter(s) determined based on the information included in the first joint DL/UL TCI state for UL transmission.

In some embodiments, the base station 103 (e.g., gNB) can indicate a second DL TCI state and a third UL TCI state to the terminal device 101 (e.g., UE) and the terminal device 101 can apply QCL information included in the second DL TCI state for receiving DL transmission and apply the UL Tx spatial filter(s) determined based on the information included in the third UL TCI state on UL transmission.

In some embodiments, the base station 103 can use the same signaling command to signal a DL TCI state and a UL TCI state. The base station 103 can use separate signaling commands to signal a DL TCI state and a UL TCI state. For example, the base station 103 can use RRC signaling to indicate a joint DL/UL TCI state, or a DL TCI state or a UL TCI state.

In one example, if the base station 105 only configures one joint DL/UL TCI state in RRC, then that joint DL/UL TCI state is to be used by the terminal device 101. In another example, if the base station 105 only configures one DL TCI state in RRC, then that DL TCI state is to be used by the terminal device 101. In some embodiments, if the base station 105 only configures one UL TCI state in RRC, then that UL TCI state is to be used by the terminal device 101.

In some embodiments, the base station 105 can use medium access control (MAC) control element (CE) signaling to indicate a joint DL/LIL TCI state, or a DL TCI state, and/or a UL TCI state. In some embodiments, the base station 105 can use a DCI to indicate a joint DL/LIL TCI state, or a DL TCI state, and/or a UL TCI state.

Cross-CC Common TCI

In some embodiments, the base station 103 and the terminal device 101 are configured to use the same set of antennae to transmit or receive signals on different component carriers (CC). In such embodiments, the terminal device 101 is configured to use the same receiving beams to receive DL signal transmitted on different component carriers and use the same UL Tx spatial filter(s) to transmit UL signal transmitted on different component carriers.

To support the foregoing operation, the base station 105 can use TCI state IDs to the terminal device 101 to indicate TCI states for providing QCL-TypeD for DL transmission and/or UL Tx spatial filter(s) for UL transmission in a set of component carriers. This function can be called as cross-CC common TCI operation.

In one example, the terminal device 101 can be configured with a first set of component carriers. The terminal device 101 can be asked to apply the same QCL-TypeD on PDCCH/PDSCH transmissions in all the component carriers contained in the first set of CCs and to apply the same UL Tx spatial filter(s) on PUSCH/PUCCH transmissions (and some SRS) in all the component carriers contained in the first set of CCs.

For each component carrier, the terminal device 101 can be configured with a list of TCI state and each TCI state contains (i) reference signal providing QCL-TypeD for DL reception, (ii) information for determining UL Tx spatial filter for UL transmission; or (iii) both QCL-TypeD for DL reception and information for determining UL Tx spatial filter for UL transmission. Each TCI state can be configured with a TCI state ID.

If the terminal device 101 is provided with a first set of component carriers and the terminal device 101 is configured to apply the same QCL-TypeD and UL Tx spatial filter in all the component carriers in the first set of CCs, the terminal device 101 can expect that the TCI states with the same TCI state ID in different component carriers in the first set would contain the same reference signal (RS) resource providing QCL-TypeD and/or UL Tx spatial filter.

In some embodiments, the terminal device 101 is configured with a first set of component carriers, and the terminal device 101 can be asked or requested to apply the same QCL-TypeD on PDCCH/PDSCH transmissions in all the component carriers contained in the first set of CCs, and apply the same UL Tx spatial filter on PUSCH/PUCCH transmissions (and some SRS) in all the component carriers contained in the first set of CCs. The UE can be provided with a list of TCI states for the first set of component carriers. In each of those TCI states, the reference signal (RS) can provide the following information: (1) QCL-TypeD configuration; (2) information for UL Tx spatial filter; and (3) QCL information other than the QCL-TypeD configuration.

In some embodiments, the QCL-TypeD configuration can be provided with a serving cell index. In one example, for the RS providing QCL-TypeD configuration, the terminal device 101 can be provided with a RS resource index and a serving cell index.

In some embodiments, the information for UL Tx spatial filter can be provided with a serving cell index. In one example, for the RS that provides UL Tx spatial filter, the terminal device 101 can be provided with a RS resource index and a serving cell index.

In some embodiments, the QCL information other than QCL-TypeD (for example, QCL-TypeA, QCL-TypeB, etc.) may not be provided with a serving cell index. In one example, for the QCL information other than QCL-TypeD, the terminal device 101 can be provided with a RS resource index. When a TCI state is applied to a first component carrier, the terminal device 101 can assume that the RS resource providing QCL other than QCL-TypeD is the RS resource identified by the RS resource index provided in the TCI state.

In some embodiments, a RS resource ID in a second TCI state can be used to provide both QCL-TypeD and another type QCL information. In such embodiments, the RS resource ID can be provided with a first serving cell index. When the second TCI state is applied to a first component carrier, the terminal device 101 can assume that the RS resource identified by the first RS resource ID and the first serving cell index provided in the second TCI state provide reference information (e.g., RS) for QCL-TypeD in receiving downlink transmission in the first component carrier.

Alternatively, the terminal devices 101 can assume that the RS resource identified by the first RS resource ID and the serving cell index of the first component carrier provide the reference information for another QCL information in receiving downlink transmission in the first component carrier.

PCI for Indicating TCI State

In some embodiments, the base station 103 can use a "DCI format 1_1" or "DCI format 1_2" with CRC (Cyclic Redundancy Check) scrambled with C-RNTI (Cell-Radio Network Temporary Identity) or MCS (Mobile Switching Center)-CNRTI to indicate one joint DL/LIL TCI state, one DL TCI state, or one UL TCI state or a pair of DL TCI state and UL TCI state to the terminal device 101.

When the terminal device is configured with a mode of common TCI, a TCI field in "DCI format 1_1" or "1_2" can indicate one of the followings:
  (A) One joint DL/UL TCI state that provides common QCL information for the terminal device 101 to receive PDCCH and PDSCH and reference for determining UL Tx spatial filter for the terminal device 101 to transmit PUSCH, PUCCH and SRS resources;
  (B) One DL TCI state that provides common QCL information for the terminal device 101 to receive PDCCH and PDSCH;
  (C) One UL TCI state that provides reference for determining UL Tx spatial filter for the terminal device 101 to transmit PUSCH, PUCCH and SRS resource; and
  (D) One pair of DL TCI state and UL TCI state, where the DL TCI state provides common QCL information for the terminal device 101 to receive PDCCH and PDSCH, and where the UL TCI state provides reference for determining UL Tx spatial filter for the terminal device 101 to transmit PUSCH, PUCCH and SRS resources.

In some embodiments, the base station 103 can use "DCI format 1_1" or "1_2" with CRC scrambled with C-RNTI to indicate one of the above TCI state(s): i.e., one joint DL/LIL TCI state, one DL TCI state or one UL TCI state, or a pair of one DL TCI state and one UL TCI state.

In some embodiments, the base station 103 can send a MAC CE activation command to map one or two TCI states to a DCI field named "Transmission Configuration Indication" of DCI format 1_1 and 1_2. In such embodiments, the DCI field "Transmission Configuration Indication" of DCI format 1_1 and 1_2 can be mapped to one of the followings:
  (I) One joint DL/UL TCI state that provides common QCL information for the terminal device 101 to receive PDCCH and PDSCH and reference information for determining UL Tx spatial filter for the terminal device 101 to transmit PUSCH, PUCCH and SRS resources;
  (II) One DL TCI state that provides common QCL information for the terminal device 101 to receive PDCCH and PDSCH;
  (III) One UL TCI state that provides reference for determining UL Tx spatial filter for the terminal device 101 to transmit PUSCH, PUCCH and SRS resources; and
  (IV) One pair of DL TCI state and UL TCI state, where the DL TCI state provides common QCL information for the terminal device 101 to receive PDCCH and PDSCH, and where the UL TCI state provides reference for determining UL Tx spatial filter for the terminal device 101 to transmit PUSCH, PUCCH and SRS resources.

FIG. 2 is a schematic diagram illustrating a joint TCI 200 in accordance with one or more implementations of the present disclosure. The joint TCI 200 can be a MAC CE activation command used by the base station 103 to map TCI states to DCI fields. As shown in FIG. 2, the joint TCI 200 includes the following fields: "Serving Cell ID," "BWP ID," "TCI state $ID_{i,1}$," "TCI state $ID_{i,2}$," "$C_{i,1}$," "$C_{i,2}$," and R.

The "Serving Cell ID" field indicates the identity of the Serving Cell for which the MAC CE applies. The length of the field can be 5 bits.

The "BWP ID" field indicates a DL BWP for which the MAC CE applies as the codepoint of the DCI bandwidth part indicator field as specified in TS 38.212 [9], The length of the BWP ID field can be 2 bits.

The "TCI state $ID_{i,1}$" field is used to indicate one joint DL/LIL TCI state or one DL TCI state. The "TCI state $ID_{i,2}$" field is used to indicate one UL TCI state.

The "$C_{i,i}$" field indicates whether the octet containing TCI state "$ID_{i,1}$" is valid. If this field is set to "1," the octet containing TCI state "$ID_{i,1}$" is present. If this field is set to "0," the octet containing TCI state "$ID_{i,1}$" is not valid.

The "$C_{i,2}$" field indicates whether the octet containing TCI state "$ID_{i,2}$" is valid. If this field is set to "1," the octet containing TCI state "$ID_{i,2}$" is present. If this field is set to "0," the octet containing TCI state "$ID_{i,2}$" is not valid.

The "R" field is a reserved bit, which can be set to "0."

ACK to TCI Indication

Referring back to FIG. 1, as described above, the base station 103 can use a DCI format to indicate TCI states for the terminal device 101. The present disclosure provides methods regarding acknowledgement for the foregoing TCI indication by the DCI format, so as to enhance the reliability of the overall operation.

In some embodiments, when the base station 103 uses DCI format 1_1 or 1_2 with CRC scrambled with C-RNTI or MCS-RNTI to indicate TCI states, and the DCI format 1_1 or 1_2 also schedules a first PDSCH transmission, acknowledge (ACK) to the first PDSCH transmission can be considered as the ACK to the TCI indication by the corresponding DCI format 1_1 or 1_2.

In some embodiments, the base station 103 can use one DCI format 1_1 or 1_2 with CRC scrambled with C-RNTI to provide DL SPS (Semi-Persistent Scheduling) PDSCH release. For a SPS PDSCH release, the terminal device 101 is expected to provide HARQ (Hybrid Automatic Repeat Request)-ACK information after "N" symbols from the last symbol of PDCCH providing the SPS PDSCH release. If the DCI format for the DL SPS PDSCH release provides a TCI state indication, the ACK to the DL SPS PDSCH release can be considered as the ACK to the TCI indication by the corresponding DCI format.

In some embodiments, the base station 103 can use one DCI format 1_1 or 1_2 with CRC scrambled with C-RNTI to activate an UL SPS PDSCH transmission. The DCI format for SPS PDSCH activation can also indicate TCI states for common TCI operation. If a SPS PDSCH activation DCI indicates the TCI states, the HARQ-ACK information to the first SPS PDSCH transmission after the SPS PDSCH activation can be considered as the ACK to the TCI state indication by that DCI.

In some embodiments, the ACK to a TCI state indication by a DCI format 1_1 or 1_2 can be determined by the type of HARQ-ACK codebook configured to one UE (e.g., the terminal device 101). For PDSCH reception, a UE can be configured with one of those two types of HARQ-ACK codebook: Type-1 HARQ-ACK codebook (also called semi-static HARQ-ACK codebook) or Type-2 HARQ-ACK codebook (also called dynamic HARQ-ACK codebook).

More particularly, the type of HARQ-ACK codebook for PDSCH can be configured though RRC parameter "pdsch-HARQ-ACK-Codebook." If the UE is configured with "pdsch-HARQ-ACK-Codebook=semi-static," the UE can be configured with "Type-1 HARQ-ACK codebook." If the UE is configured with "pdsch-HARQ-ACK-Codebook=dynamic," the UE can be configured with "Type-2 HARQ-ACK codebook."

To determine the ACK to the TCI state indication by a DCI format, the following conditions can be considered. If the UE is configured with "Type-1 HARQ-ACK" codebook, the ACK to a TCI state indication by a DCI is the ACK to the PDSCH transmission scheduled by the same DCI. If the UE is configured with "Type-2 HARQ-ACK" codebook, the ACK to a TCI state indication by a DCI is the HARQ-ACK information to the PDSCH transmission scheduled by the same DCI. In other words, the ACK to a TCI state indication by a DCI can be the ACK or NACK information to the PDSCH transmission scheduled by the same DCI.

TCI State Indication Timeline

When the base station 103 sends one DCI format indicating TCI states at slot "n" and a UE (e.g., the terminal device 101) sends ACK to the TCI state indication by a DCI format at slot "m," the UE can apply the indicated TCI states on downlink reception and/or uplink transmission starting from the first slot sometime after the transmission of DCI and/or the transmission of the ACK to the TCI state indication.

As a first example, the UE can apply the indicated TCI state starting from the first slot, which is "X" time duration after the last symbol of PDCCH providing DCI carrying TCI state indication. For example, the "X" time duration can be "X1" symbols. For example, the "X" time duration can be "X2" slots. For example, the "X" time duration can be "X3" milliseconds.

As a second example, the UE can apply the indicated TCI state starting from the first slot, which is "X" time duration after the ACK to the TCI state indication carried in the DCI. For example, the "X" time duration can be "X1" symbols, "X2" slots, or "X3" milliseconds.

In some embodiments, the UE can apply the indicated TCI state starting from the first slot which is "Y" time duration after the last symbol of PDCCH providing DCI carrying TCI state indication and also "Z" time duration after the ACK the TCI state indication carried in the DCI.

In some embodiments, a UE receives a DCI format indicating TCI state at slot "n" and the UE sends the ACK to the TCI state indication by the DCI format at slot "m." The UE then applies the QCL information provided by the indicated TCI state from the first slot which is at least "$P_1$" symbols after the last symbol of PDCCH carrying the TCI state indication DCI and also at least "$P_2$" symbols after the ACK to the TCI state indication. In some embodiments, the value of "$P_1$" can be reported as a UE capability. In some embodiments, the value of "$P_2$" can be pre-specified (e.g., in a specification) or configured by the base station 103.

In some embodiments, the values of "$P_1$" and "$P_2$" can be different values for DL TCI state indication and UL TCI state indication. In some embodiments, the values of "$P_1$" and "$P_2$" can be determined based on if the indicated TCI state contains a non-serving cell RS providing reference for QCL configuration or reference information for determining UL Tx spatial filter for uplink transmission.

For example, if the indicated TCI state contains a non-serving cell RS providing TCI for DL or UL transmission, the values of "$P_1$" or "$P_2$" can be "a1" or "a2." If the indicated TCI state contains a non-serving cell RS providing TCI for DL or UL, the value of "$P_1$" or "$P_2$" can be b1 or b2. In some embodiments, these values can have the following relationships: "a1>b1" and "a2>b2."

In some embodiments, the values of "$P_1$" and "$P_2$" are determined based on if a UE needs to switch the panel to receive the DL transmission or transmit UL transmission.

Power Control and TCI State

In some embodiments, one TCI state that provides reference for determining uplink Tx spatial filter for UL transmission can be configured (or associated) with one or more of the following uplink transmit power control parameters: pathloss reference signal, parameter "$P_0$" that provides a target signal power level, parameter "alpha," an index for closed loop power control, etc.

In some embodiments, each TCI state that provides reference for determining uplink Tx spatial filters for PUSCH, PUCCH or SRS transmission can be configured (or associated) with a pathloss reference signal. When a first TCI state is indicated to a UE to provide uplink TCI, the UE determines the uplink Tx spatial filter for transmitting PUSCH, PUCCH or SRS according to the reference signal contained in the first TCI state. To determine the transmit power for the corresponding PUSCH, PUCCH or SRS transmission, the UE uses the path loss estimated from the pathloss reference signal that is configured or associated with the first TCI state.

In some implementations, the same reference signal (for example a SS (synchronization signal)/PBCH block or CSI-RS (Channel state information reference signal) resource) can be configured to provide reference for both QCL-TypeD for PDSCH/PDCCH and reference for determining uplink Tx spatial filter for PUSCH, PUCCH and SRS. In this TCI state, the same reference signal can be used as the pathloss reference signal for this TCI state. In other words, in a joint DL/UL TCI state, the reference signal configured as reference for QCL-TypeD can be used to provide reference for determining uplink Tx spatial filter as well as be used to provided pathloss reference signal. In some embodiments, the reference signal configured for QCL-TypeD and reference for determining uplink Tx spatial filter can be a periodic reference signal, for example a SS/PBCH block or a periodic CSI-RS resource.

In one example, a first reference signal can be configured in a TCI state to provide the pathloss reference signal. The first reference signal can be a SS/PBCH block or periodic CSI-RS resource. When the UE applies the TCI state on uplink transmission, the UE may determine the uplink transmit power for the uplink transmission based on the pathloss estimated from measuring the first reference signal.

In another example, an uplink TCI state can be configured with a second reference signal that provides reference for determining uplink Tx spatial filter for PLISCH, PUCCH or SRS. The first reference signal can be a SS/PBCH block, CSI-RS resource or SRS resource. The second reference signal can be used as the pathloss reference signal that is associated with this TCI state. If the second reference signal is an SRS resource or non-periodic CSI-RS resource, a third reference signal can be configured in the TCI state to provide pathloss reference signal.

In some embodiments, one TCI state can be associated with a pathloss reference signal that can be a SS/PBCH block or periodic CSI-RS resource. When the UE applies that TCI state on an UL transmission (for example PUSCH, PUCCH or SRS), the UE determines the UL transmit power for that UL transmission based on the pathloss estimated from that associated pathloss reference signal.

In one example, in RRC, a UE can be configured with one list of SS/PBCH blocks or periodic CSI-RS resource for pathloss reference signal. One TCI state can be associated with one of those pathloss reference signal.

In another example, the base station 103 can use a MAC CE command to activate the association between a TCI state and a pathloss reference signal. For example, the base station 103 can use the MAC CE command to activate one or more TCI states and to map the TCI states to each codepoint of TCI indication fields in a DCI. In this MAC CE, the base station 103 can also activate one or more pathloss reference signals and map each activated TCI state to an activated pathloss reference signal.

If a TCI state is configured or associated with a pathloss reference signal, the UE can apply a default pathloss reference signal on an uplink transmission if the UE is indicated to apply that TCI state on the uplink transmission. In one example, if a first TCI state is not configured with or associated with a pathloss reference signal and the UE is indicated with the first TCI state for determining uplink Tx spatial filter for PUSCH, PUCCH or SRS, the UE determines the uplink transmit power for that PLISCH, PUCCH or SRS based on the pathloss estimated from a default pathloss reference signal. The default pathloss reference signal can be determined by one or more of the following methods:

[1] The default pathloss reference signal can be the SS/PBCH block that is used by the UE to obtain Master Information Block (MIB) in the serving cell.

[2] The default pathloss reference signal can be the SS/PBCH block or periodic CSI-RS associated with the latest successful Physical Random Access Channel (PRACH) transmission.

[3] The default pathloss reference signal can be one particular entry in the list of pathloss reference signals configured in RRC. For example, the UE can be configured with a list of SS/PBCH blocks or periodic CSI-RS resources for pathloss reference signal in RRC. The default pathloss reference signal can be the first entry in the list configured in RRC.

[4] The default pathloss reference signal can be the SS/PBCH block or periodic CSI-RS resource contained in the first TCI state to provide reference for determining uplink Tx spatial filter for PUSCH, PUCCH or SRS.

[5] The default pathloss reference signal can be the SS/PBCH block or periodic CSI-RS resource contained in the first TCI state to provide reference QCL-TypeD.

[6] The default pathloss reference signal can be the SS/PBCH block or periodic CSI-RS resource contained in the first TCI state to provide reference QCL information.

In some embodiments, each TCI state that provides reference for determining uplink Tx spatial filters for PUSCH, PUCCH or SRS transmission can be configured or associated with uplink power control parameter $P_0$, alpha and closed loop index. When a first TCI state is indicated to a UE to provide uplink TCI, the UE determines the uplink Tx spatial filter for transmitting PUSCH, PUCCH or SRS according to the uplink power control parameter $P_0$, alpha and closed loop index configured or associated with the first TCI state.

In some embodiments, in RRC, a UE can be configured with a list of uplink power control parameter sets and each set may include at least $P_0$, alpha and closed loop index. A TCI state providing uplink TCI can be associated with a first set of uplink power control parameters. When the TCI state is indicated for providing common TCI for PLISCH and PUCCH, the UE determines the transmit power for PUSCH or PUCCH according to the first set of uplink power control parameter associated with the TCI state (the foregoing setting can be applied to SRS transmission).

In some embodiments, in RRC, a UE can be configured with a list of uplink power control parameter sets and each set may include at least $P_0$, alpha and closed loop index. A TCI state providing uplink TCI can be associated with a first set of uplink power control parameters for PUSCH transmission and a second set of uplink power control parameters for PUCCH transmission. When the TCI state is indicated for providing common TCI for PUSCH and PUCCH, the UE determines the transmit power for PUSCH according to the first set of uplink power control parameter associated with the TCI state and for PUCCH according to the second set of uplink power control parameter associated with the TCI state.

In some embodiments, the base station 103 can use one MAC CE command to map a TCI state with a set of uplink power control parameters. The base station 103 can use one MAC CE command to activate one or more TCI states and map one TCI state to a set of uplink power control parameters that $P_0$, alpha and closed loop index.

In some embodiments, the base station 103 can use an MAC CE command to activate one or more TCI states and to map the TCI states to each codepoint of TCI indication field in DCI. In the MAC CE, the base station 103 can also activate one or more sets of uplink power control parameters and map each activated TCI state to an activated set of uplink power control parameters.

In some embodiments, the base station 103 can use one MAC CE command to map a TCI state with a first set of uplink power control parameters for PUSCH and a second set of uplink power control parameters for PUCCH. The base station 103 can use one MAC CE command to activate one or more TCI states and map one TCI state to a first set of uplink power control parameters that $P_0$, alpha and closed loop index, which is applied to PUSCH transmission and a second set of uplink power control parameters that $P_0$, alpha and closed loop index, which is applied to PUCCH transmission.

In some embodiments, the base station 103 can use an MAC CE command to activate one or more TCI states and to map TCI state(s) to each codepoint of TCI indication field in DCI. In this MAC CE, the base station 103 can also activate one or more sets of uplink power control parameters and map each activated TCI state to a first activated set of uplink power control parameters for PLISCH and a second activated set of uplink power control parameters for PUCCH.

For SRS transmission, the uplink power control parameters $P_0$, alpha and closed loop index can be configured or provided with one or more of the following methods:

[A] a UE can be configured with one or more SRS resource sets and for each SRS resource set, the UE can be configured with one or more SRS resources. The UE can be provided with uplink parameters $P_0$, alpha and closed loop index for each SRS resource set.

[B] In RRC, a UE can be configured with a list of uplink power control parameter sets and each set may include at least $P_0$, alpha and closed loop index. A TCI state providing uplink TCI can be associated with a set of uplink power control parameters for SRS. When the UE is indicated with the TCI state for SRS, the UE may determine the uplink transmit power for SRS according to the uplink power control parameters $P_0$, alpha and closed loop index that are associated with the TCI state.

In one method, the gNB can use one MAC CE command to map a TCI state with a set of uplink power control parameters for SRS transmission. The gNB can use one MAC CE command to activate one or more TCI states and map one TCI state to a set of uplink power control parameters that $P_O$, alpha and closed loop index for SRS transmission.

In some embodiments, the base station 103 can use an MAC CE command can activate one or more TCI states and to map the TCI states to each codepoint of TCI indication field in DCI. In the MAC CE, the base station 103 can also activate one or more sets of uplink power control parameters and map each activated TCI state to an activated set of uplink power control parameters for SRS transmission.

Figure 3:
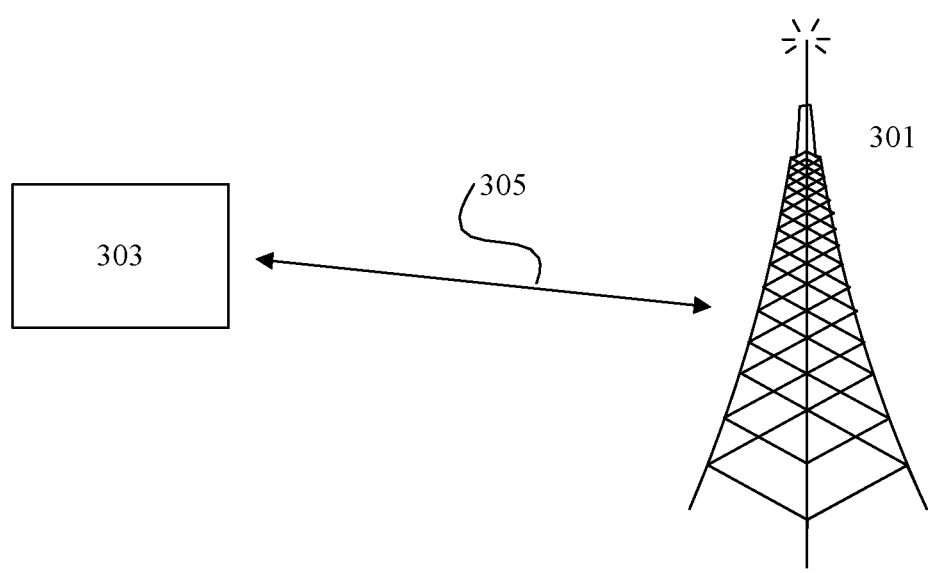
FIG. 3 is a schematic diagram of a wireless communication system in accordance with one or more implementations of the present disclosure.

FIG. 3 is a schematic diagram of a wireless communication system 300 in accordance with one or more implementations of the present disclosure. The wireless communication system 300 can implement the methods discussed herein. As shown in FIG. 3, the wireless communications system 300 can include a network device (or base station) 301. Examples of the network device 301 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device 301 can include a relay station, an access point, an in-vehicle device, a wearable device, and the like. The network device 301 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as a new radio (New Radio, NR) system or network.

In FIG. 3, the wireless communications system 300 also includes a terminal device 303. The terminal device 303 can be an end-user device configured to facilitate wireless communication. The terminal device 303 can be configured to wirelessly connect to the network device 301 (via, e.g., via a wireless channel 305) according to one or more corresponding communication protocols/standards. The terminal device 303 may be mobile or fixed. The terminal device 303 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 303 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IoT) device, a device used in a 5G network, a device used in a public land mobile network, or the like. For illustrative purposes, FIG. 3 illustrates only one network device 301 and one terminal device 303 in the wireless communications system 300. However, in some instances, the wireless communications system 300 can include additional network device 301 and/or terminal device 303.

Figure 4:
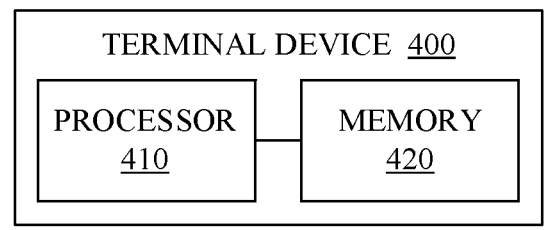
FIG. 4 is a schematic block diagram of a terminal device in accordance with one or more implementations of the present disclosure.

FIG. 4 is a schematic block diagram of a terminal device 400 in accordance with one or more implementations of the present disclosure. FIG. 4 is a schematic block diagram of a terminal device 400 in accordance with one or more implementations of the present disclosure. As shown, the terminal device 400 includes a processing unit 410 (e.g., a DSP, a CPU, a GPU, etc.) and a memory 420. The processing unit 410 can be configured to implement instructions that correspond to the method 400 of FIG. 4 and/or other aspects of the implementations described above. It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the devices and methods described herein are intended to include, but are not limited to, these memories and memories of any other suitable type.

Figure 5:
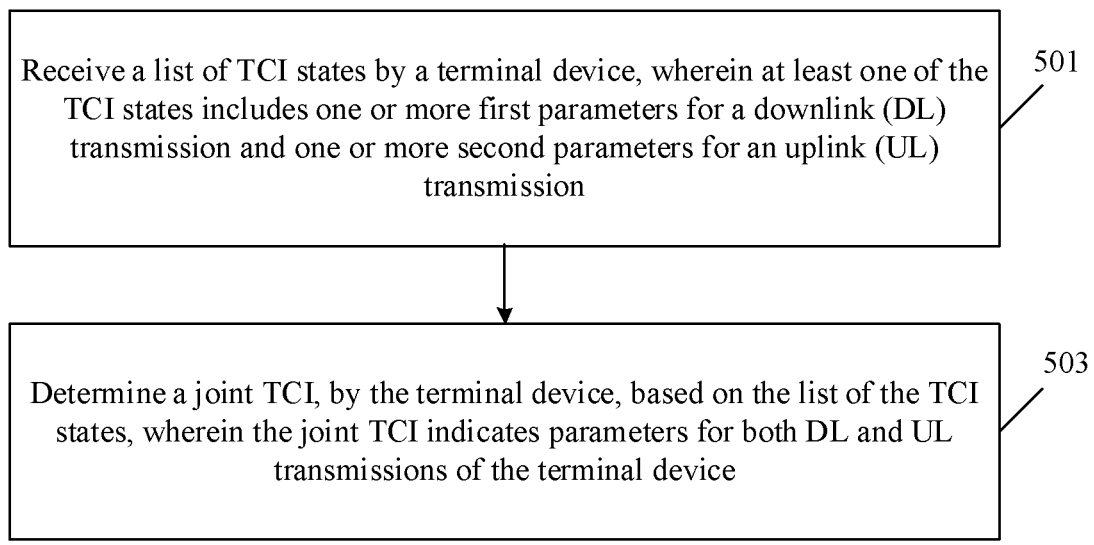
FIG. 5 is a flowchart of a method in accordance with one or more implementations of the present disclosure.

FIG. 5 is a flowchart of a method 500 in accordance with one or more implementations of the present disclosure. The method 500 can be implemented by a system (such as the joint TCI framework 100). The method 500 is for configuring a transmission configuration indicator (TCI). The method 500 includes, at block 501, receiving a list of TCI states by a terminal device. At least one of the TCI states includes one or more first parameters for a downlink (DL) transmission and one or more second parameters for an uplink (UL) transmission.

In some embodiments, the one or more first parameters are for providing quasi co-location (QCL) information for the DL transmission. In some embodiments, the one or more second parameters are for determining a uplink transmission spatial filter for the UL transmission. In some embodiments, the at least one of the TCI states includes a reference signal identification corresponding to both the QCL information and the uplink transmission spatial filter. In some embodiments, the DL transmission includes transmission via a physical downlink control channel (PDCCH) or a physical downlink shared channel (PDSCH). In some embodiments, the UL transmission includes transmission via a physical uplink control channel (PUCCH) or a physical uplink shared channel (PLISCH).

At block 503, the method 500 continues by determining a joint TCI, by the terminal device, based on the list of the TCI states. The joint TCI indicates parameters for both DL and UL transmissions of the terminal device.

In some embodiments, the determined joint TCI supports transmissions across multiple common carriers (CCs). In some embodiments, the method 500 further comprises indicating the joint TCI via down link control information (DCI) in DCI format 1_1 or DCI format 1_2.

In some embodiments, the method 500 further comprises generating an acknowledgment (ACK) signal in response to the DCI. In some embodiments, the method 500 further comprises indicating the joint TCI via a radio resource control (RRC) signal.

In some embodiments, the joint TCI includes a Media Access Control (MAC) Control Element (CE) activation command. In some embodiments, the joint TCI includes a serving cell identification and a bandwidth part (BWP) identification. In some embodiments, the joint TCI includes multiple TCI state identifications configured to indicate a joint DL/UL TCI state, a DL TCI state, or a UL TCI state.

In some embodiments, the method 500 further comprises indicating the joint TCI via a DCI with Cyclic Redundancy Check (CRC) scrambled with C-RNTI (Cell-Radio Network Temporary Identity) to provide DL SPS(Semi-Persistent Scheduling) PDSCH release or UL SPS PDSCH transmission.

In some embodiments, the at least one of the TCI states is configured with at least one of the following power control parameters: a pathloss reference signal, a parameter that provides a target signal power level, an index for closed loop power control.

In some embodiments, the method 500 can be implemented by a base station. In such embodiment, the method 500 can include (i) transmitting a list of TCI states from a base station; (ii) causing a terminal device to determine a joint TCI based on the list of the TCI states and a single signaling. At least one of the TCI states includes one or more first parameters for a downlink (DL) transmission and one or more second parameters for an uplink (UL) transmission. The joint TCI indicates parameters for both DL and UL transmissions of the terminal device. In some embodiments, the single signaling can be down link control information (DCI) in DCI format 1_1 or DCI format 1_2 or a radio resource control (RRC) signal.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The invention claimed is:

1. A method for configuring a transmission configuration indicator (TCI), performed by a terminal device, the method comprising:
   receiving a media access control control element (MAC CE) activation command sent from a base station, wherein the MAC CE activation command maps a pair of downlink (DL) TCI state and uplink (UL) TCI state to a downlink control information (DCI) field named "transmission configuration indication" of DCI format 1_1 and DCI format 1_2, and the DL TCI state in the pair provides parameters for a DL transmission and the UL TCI state in the pair provides parameters for an UL transmission; and
   determining, based on the MAC CE activation command, the parameters for the DL transmission and the parameters for the UL transmission of the terminal device.

2. The method of claim 1, wherein the pair of DL TCI state and UL TCI state transmissions across multiple common carriers (CCs).

3. The method of claim 1, further comprising receiving DCI in DCI format 1_1 or DCI format 1_2, wherein the DCI comprises the DCI field named "transmission configuration indication".

4. The method of claim 3, further comprising transmitting an acknowledgment (ACK) signal in response to the DCI.

5. The method of claim 1, wherein at least one of the following applies: the parameters for the DL transmission are for providing quasi co-location (QCL) information for the DL transmission; or the parameters for the UL transmission are for determining an uplink transmission spatial filter for the UL transmission.

6. The method of claim 1, wherein at least one of the following applies: the DL transmission includes transmission via a physical downlink control channel (PDCCH) or a physical downlink shared channel (PDSCH); or the UL transmission includes transmission via a physical uplink control channel (PUCCH) or a physical uplink shared channel (PUSCH).

7. The method of claim 1, further comprising receiving DCI with Cyclic Redundancy Check (CRC) scrambled with cell-radio network temporary identity (C-RNTI) to provide DL semi-persistent scheduling (SPS) PDSCH release or UL SPS PDSCH transmission, wherein the DCI comprises the DCI field named "transmission configuration indication".

8. The method of claim 1, wherein the pair of DL TCI state and UL TCI state are configured with at least one of the following power control parameters: a pathloss reference signal, a parameter that provides a target signal power level, an index for closed loop power control.

9. A device for configuring a transmission configuration indicator (TCI), comprising:
   a processor;
   a memory configured to store instructions, when executed by the processor, to:
   receive a media access control control element (MAC CE) activation command sent from a base station, wherein the MAC CE activation command maps a pair of downlink (DL) TCI state and uplink (UL) TCI state to a downlink control information (DCI) field named "transmission configuration indication" of DCI format 1_1 and DCI format 1_2, and the DL TCI state in the pair provides parameters for a DL transmission and the UL TCI state in the pair provides parameters for an UL transmission; and
   determine, based on the MAC CE activation command, the parameters for the DL transmission and the parameters for the UL transmission of a terminal device.

10. The device of claim 9, wherein the instructions are further to:
   receive DCI in DCI format 1_1 or DCI format 1_2, wherein the DCI comprises the DCI field named "transmission configuration indication".

11. The device of claim 9, wherein
   the pair of DL TCI state and UL TCI state support transmissions across multiple common carriers (CCs);
   the parameters for the DL transmission are for providing quasi co-location (QCL) information for the DL transmission;
   the parameters for the UL transmission are for determining an uplink transmission spatial filter for the UL transmission;

the DL transmission includes transmission via a physical downlink control channel (PDCCH) or a physical downlink shared channel (PDSCH); and the UL transmission includes transmission via a physical uplink control channel (PUCCH) or a physical uplink shared channel (PUSCH).

12. The device of claim 9, wherein the instructions are further to: transmit an acknowledgment (ACK) signal in response to the DCI.

13. The device of claim 9, wherein the instructions are further to: receive DCI with cyclic redundancy check (CRC) scrambled with cell-radio network temporary identity (C-RNTI) to provide DL semi-persistent scheduling (SPS) PDSCH release or UL SPS PDSCH transmission, wherein the DCI comprises the DCI field named "transmission configuration indication".

14. The device of claim 9, wherein the pair of DL TCI state and UL TCI state are configured with at least one of the following power control parameters: a pathloss reference signal, a parameter that provides a target signal power level, an index for closed loop power control.

15. A device for configuring a transmission configuration indicator (TCI), comprising:

a processor;

a memory configured to store instructions, when executed by the processor, to:

transmit a media access control control element (MAC CE) activation command, wherein the MAC CE activation command maps a pair of downlink (DL) TCI state and uplink (UL) TCI state to a downlink control information (DCI) field named "transmission configuration indication" of DCI format 1_1 and DCI format 1_2, and the DL TCI state in the pair provides parameters for a DL transmission and the UL TCI state in the pair provides parameters for an UL transmission, wherein the MAC CE activation command is used by a terminal device to determine the parameters for the DL transmission and the parameters for the UL transmission of the terminal device.

16. The device of claim 15, wherein the instructions are further to: transmit DCI in DCI format 1_1 or DCI format 1_2, wherein the DCI comprises the DCI field named "transmission configuration indication".

17. The device of claim 15, wherein the instructions are further to: receive an acknowledgment (ACK) signal sent in response to the DCI.

18. The device of claim 15, wherein the pair of DL TCI state and UL TCI state support transmissions across multiple common carriers (CCs);

the parameters for the DL transmission are for providing quasi co-location (QCL) information for the DL transmission;

the parameters for the UL transmission are for determining an uplink transmission spatial filter for the UL transmission;

the DL transmission includes transmission via a physical downlink control channel (PDCCH) or a physical downlink shared channel (PDSCH); and the UL transmission includes transmission via a physical uplink control channel (PUCCH) or a physical uplink shared channel (PUSCH).

19. The device of claim 15, wherein the instructions are further to: transmit DCI with cyclic redundancy check (CRC) scrambled with cell-radio network temporary identity (C-RNTI) to provide DL semi-persistent scheduling (SPS) PDSCH release or UL SPS PDSCH transmission, wherein the DCI comprises the DCI field named "transmission configuration indication".

20. The device of claim 15, wherein the pair of DL TCI state and UL TCI state are configured with at least one of the following power control parameters: a pathloss reference signal, a parameter that provides a target signal power level, an index for closed loop power control.

* * * * *